(12) United States Patent
Narita et al.

(10) Patent No.: US 9,617,350 B2
(45) Date of Patent: *Apr. 11, 2017

(54) METHODS FOR PREPARING ALKALI CELLULOSE AND CELLULOSE ETHER

(75) Inventors: Mitsuo Narita, Joetsu (JP); Masaki Tabata, Joetsu (JP); Atsushi Yoshida, Joetsu (JP); Hiroshi Umezawa, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 915 days.

This patent is subject to a terminal disclaimer.

(21) Appl. No.: 11/614,587

(22) Filed: Dec. 21, 2006

(65) Prior Publication Data

US 2007/0149771 A1    Jun. 28, 2007

(30) Foreign Application Priority Data

Dec. 27, 2005 (JP) ................................. 2005-375210
Dec. 8, 2006 (JP) ................................. 2006-332452

(51) Int. Cl.
| | | |
|---|---|---|
| *C07H 1/00* | (2006.01) | |
| *C08B 11/00* | (2006.01) | |
| *C08B 1/08* | (2006.01) | |
| *C08B 1/10* | (2006.01) | |
| *C08B 11/16* | (2006.01) | |
| *C08B 11/193* | (2006.01) | |

(52) U.S. Cl.
CPC .................. *C08B 1/08* (2013.01); *C08B 1/10* (2013.01); *C08B 11/00* (2013.01); *C08B 11/16* (2013.01); *C08B 11/193* (2013.01)

(58) Field of Classification Search
CPC .................................. C07H 1/00; C08B 11/00
USPC ........................................................ 536/124
See application file for complete search history.

(56) References Cited

U.S. PATENT DOCUMENTS

| | | | |
|---|---|---|---|
| 4,117,223 A | 9/1978 | Lodige et al. | |
| 4,244,778 A * | 1/1981 | Lindahl et al. | ................ 162/17 |
| 4,310,663 A | 1/1982 | Hilbig et al. | |
| 4,339,574 A * | 7/1982 | Wust et al. | ..................... 536/84 |
| 4,363,784 A | 12/1982 | Hilbig et al. | |
| 4,508,895 A | 4/1985 | Balser | |
| 4,826,917 A * | 5/1989 | Kondo et al. | ................... 525/59 |
| 6,884,883 B1 * | 4/2005 | Shima et al. | ................... 536/56 |
| 2002/0099203 A1 | 7/2002 | Kobayashi | |

FOREIGN PATENT DOCUMENTS

| | | |
|---|---|---|
| GB | 708061 | 4/1954 |
| JP | 56002302 | 1/1981 |
| JP | 60040101 | 3/1985 |
| JP | 1985050801 | 11/1985 |
| JP | 3-73562 | 11/1991 |
| JP | 2003-171401 | 6/2003 |
| JP | 2003-183301 | 7/2003 |
| WO | WO 2005/026618 A | 3/2005 |

OTHER PUBLICATIONS

*Cellulose No Jiten* (Encyclopedia of Cellulose), Edited By The Cellulose Society Of Japan, Oct. 10, 2000.
Office Action for Chinese Application No. CN 200610156799.9 issued Mar. 29, 2010.
Office Action from Japanese Patent Application No. 2006-332452, dated Mar. 2, 2012.

\* cited by examiner

*Primary Examiner* — Sudhakar Katakam
*Assistant Examiner* — Everett White
(74) *Attorney, Agent, or Firm* — Alston & Bird LLP

(57) ABSTRACT

The invention is a method for efficiently preparing alkali cellulose having a uniform alkali distribution therein. More specifically, the invention is a method for preparing alkali cellulose comprising steps of bringing pulp into continuous contact with an alkali metal hydroxide solution in a bucket conveyor type contactor to generate a contact mixture, and draining the contact mixture; a method for preparing a cellulose ether comprising use of the alkali cellulose thus prepared; and an apparatus for preparing alkali cellulose comprising a bucket conveyor type contactor comprising at least one inlet port for introducing pulp and an alkali metal hydroxide solution at one end and at least one outlet port for discharging a contact mixture wherein the pulp and the alkali metal hydroxide solution can be moved from one end to the other end while bringing them into contact with each other to generate the contact mixture; and a drainer for separating a cake from the contact mixture discharged from the outlet port.

6 Claims, 1 Drawing Sheet

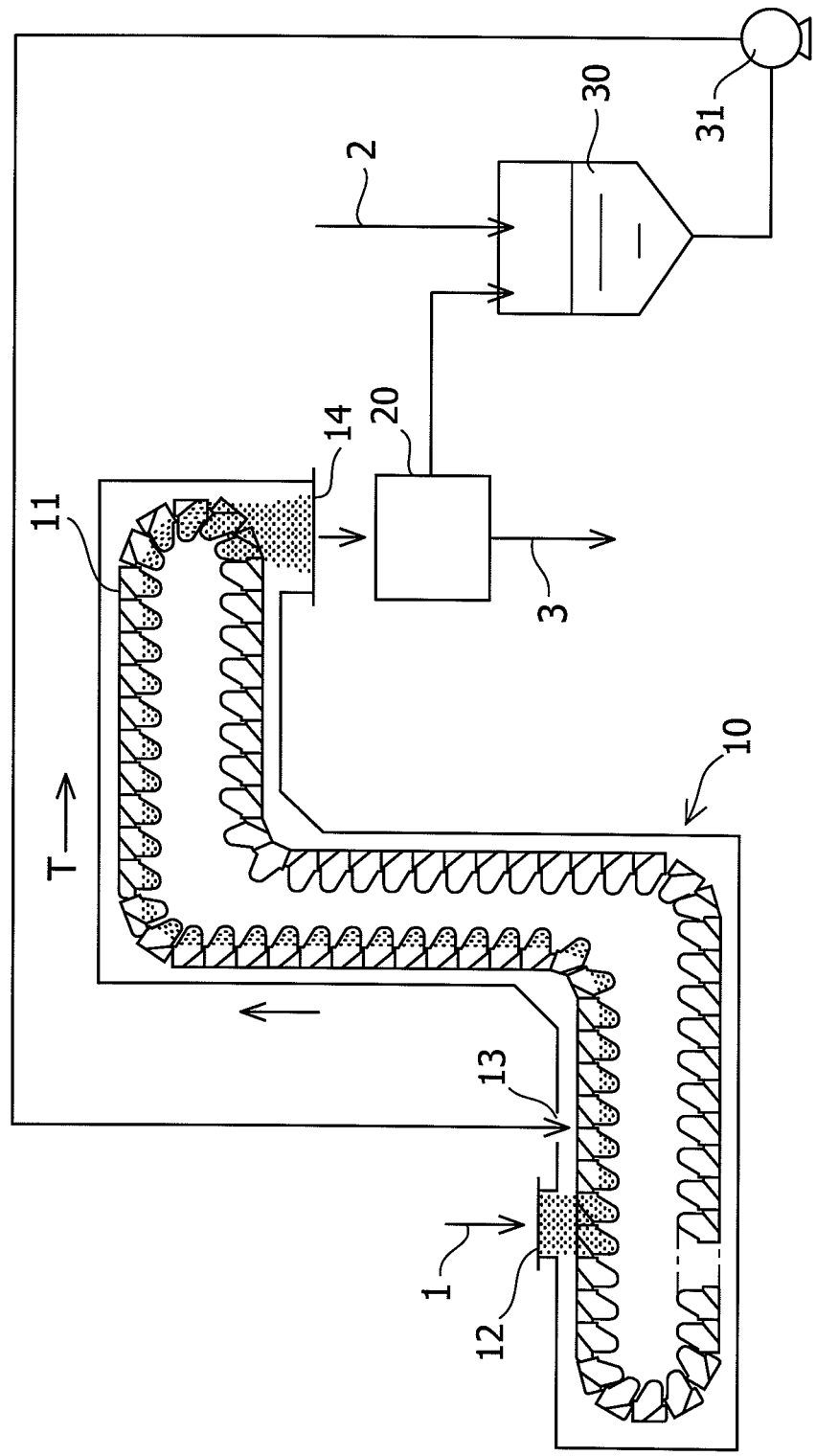

METHODS FOR PREPARING ALKALI CELLULOSE AND CELLULOSE ETHER

BACKGROUND OF THE INVENTION

1. Field of the Invention

The present invention relates to alkali cellulose and a method for preparing cellulose ether using the same.

2. Description of the Related Art

For preparation of cellulose ether, known is a method comprising steps of bringing highly purified pulp into contact with an alkali solution to prepare alkali cellulose, and then etherifying the alkali cellulose with an etherifying agent. Although the cellulose ether obtained as a final product becomes soluble in water by properly controlling the degree of substitution, the cellulose ether contains a water-insoluble portion so that the light transmittance of the aqueous solution may be lowered or the commodity value of the cellulose ether may be damaged as a foreign matter.

The insoluble portion is caused by the presence of a portion having a low degree of substitution which does not have enough substituents to permit dissolution of the cellulose ether in water. One of the causes of it is uneven alkali distribution in the alkali cellulose.

The rolls the alkali plays includes (a) swelling the cellulose to change the crystal structure in the pulp, thereby accelerating the penetration of the etherifying agent, (b) catalyzing the etherification reaction of an alkylene oxide; and (c) serving as a reactant for an alkyl halide. A portion of the pulp out of contact with the aqueous alkali solution is not involved in the reaction and therefore remains as an insoluble portion. Thus, uniformity of the alkali cellulose is related to an amount of the insoluble portion in the alkali cellulose.

A method which has been employed widely for the preparation of an alkali cellulose includes one described in described in Japanese Patent Application Examined Publication No. 60-50801/1985 or Japanese Patent Application Unexamined Publication No. 56-2302/1981 in which an alkali is added in an amount necessary for etherification to pulp powder obtained by pulverization of pulp, and then mixed by mechanically. In this method, however, the alkali is not distributed to all parts of the pup powder so that some parts of the pulp powder remain out of contact with the alkali. As a result, some parts fail to become cellulose ether, stay in the product as an unreacted substance and deteriorate the quality of the cellulose ether. Thus, this method causes a problem.

In order to avoid causing such a problem, a method comprising steps of impregnating a sheet of pulp in an excess alkali solution to allow the pulp to absorb a sufficient amount of an alkali and then pressing the impregnated sheet to remove an unnecessary portion of the alkali and control the alkali to a predetermined amount. When this method is performed industrially, it is the common practice that a rolled pulp is allowed to be rotated freely by elevating the rolled pulp by a supporting shaft put through the central pipe of the roll so as to bring it up from a floor surface, or placing the rolled pulp over a roller. Then, a sheet is drawn from the rolled pulp and introduced into an immersion tank. However, according to this method, the operation is often interrupted because the pulp sheet is torn by a pull force during the immersion. Moreover, to achieve mass production, a huge immersion tank is required for immersing the pulp sheet therein for a predetermined time. Accordingly, this method has defects such as necessity of an adequate space for the tank and inevitable rise in the investment cost. On the other hand, when pulp chips are employed, the cake of them has an irregular surface so that the uneven squeeze occurs when pressed by the press machine. Uneven alkali distribution caused by the uneven squeeze deteriorates the quality of the alkali cellulose.

In page 433 of "Encyclopedia of Cellulose" edited by The Cellulose Society of Japan (published on Nov. 10, 2000), described is a preparation method of alkali cellulose for preparation of viscose, the step comprising adding pulp to an alkali solution to form a gruel-like slurry and squeezing the slurry by a slurry press. Although the defects caused by use of a sheet of pulp are solved, the slurry press causes uneven squeeze and thereby deteriorates the quality of the alkali cellulose due to uneven alkali distribution. In addition, it is difficult to obtain alkali cellulose having a relatively small alkali content which is required as a raw material of cellulose ether using this method alone because of the limitation of the squeeze performance. Thus, it is difficult to apply this method to the preparation of cellulose ether.

In Japanese Patent Publication Examined Publication No. 3-73562/1991, described is a method of preparing alkali cellulose having a desired composition, comprising steps of preparing alkali cellulose from cellulose and excess alkali, and then washing the alkali cellulose with a hydrophilic solvent for removal of the alkali. However, this method needs huge equipment and many operations. In addition, the hydrophilic solvent remains in the alkali cellulose and causes a side reaction with an etherifying agent. Accordingly, a reaction efficiency of the etherifying agent is reduced. Neutralization of the washing liquid or recovery of the alkali is required. Thus, this method is industrially difficult.

SUMMARY OF THE INVENTION

The present invention provides a method for efficiently preparing alkali cellulose having a uniform alkali distribution.

In one aspect of the present invention, there is thus provided a method for preparing alkali cellulose, comprising steps of:
  bringing pulp into continuous contact with an alkali metal hydroxide solution in a bucket conveyor type contactor to generate a contact mixture, and
  draining the contact mixture.

In another aspect of the present invention, there is also provided a method for preparing cellulose ether, comprising use of the alkali cellulose.

In a further aspect of the present invention, there is also provided an apparatus for preparing alkali cellulose, comprising:
  a bucket conveyor type contactor comprising
    at least one inlet port at one end for introducing pulp and an alkali metal hydroxide solution and
    at least one outlet port at the other end for discharging a contact mixture
    wherein the pulp and the alkali metal hydroxide solution can be moved from one end to the other end, while bringing them into contact with each other to generate the contact mixture; and
  a drainer for separating a cake from the contact mixture discharged from the outlet port.

According to the present invention, alkali cellulose having a uniform alkali distribution therein can be prepared efficiently. As a result, cellulose ether having high transparency can be prepared efficiently.

BRIEF DESCRIPTION OF THE DRAWING

FIG. 1 illustrates an example of a preparation apparatus of alkali cellulose.

DETAILED DESCRIPTION OF THE PREFERRED EMBODIMENT

The pulp to be used in the present invention may be preferably in the form of powder or chips.

The pulp powder may be available by pulverizing a pulp sheet and it is in the form of powder. An average particle size of the pulp powder may be, but not limited to, usually 10 to 1,000 μm. Although no limitation is imposed on the preparation method of the pulp powder, a pulverizer such as knife and hammer mill can be used.

Although no limitation is imposed on the preparation method of pulp chips, the pulp chips may be produced by cutting a pulp sheet with a known cutting device such as a slitter cutter. A continuous cutting device may be advantageous from the viewpoint of investment cost. The plane surface area of the chip may be usually from 4 to 10,000 mm$^2$, especially preferably from 10 to 2,500 mm$^2$. It may be difficult to prepare the chip having the plane surface area smaller than 4 mm$^2$. The chip having the plane surface area greater than 10,000 mm$^2$ may pose difficulties in handling such as introducing into a bucket conveyor type contactor, transferring inside of the contactor, and introducing into a drainer. Considering the pulp chip as a hexahedron, the plane surface area of the chip is the largest surface area of six surface areas of the hexahedral chip.

In the present invention, a ratio of the weight of the pulp to the volume of the alkali metal hydroxide solution to be introduced into a bucket conveyor per hour may be preferably 0.15 kg/L or less, more preferably 0.10 kg/L or less, still more preferably 0.05 kg/L or less. When the ratio is more than 0.15 kg/L, complete immersion may become difficult so that an alkali distribution in the alkali cellulose may become uneven and the quality of the product may be deteriorated. The lower limit of this ratio may be preferably 0.0001 kg/L.

The term "bucket conveyor type contactor" to be used in the present invention means a conveyor which can carry out conveyance using an endless chain or a belt equipped with a large number of buckets. Although no particular limitation is imposed on its structure, a centrifugal discharge type, a complete discharge type or an inductive discharge type conveyor can be used. Of these, the inductive discharge type one may be especially preferred.

FIG. 1 illustrates an example of an apparatus for preparing alkali cellulose comprising a bucket conveyor type contactor 10 and a drainer 20 for draining the contact mixture generated in the bucket conveyor type contactor.

The bucket conveyor type contactor 10 comprises, in addition to a bucket conveyor 11, an inlet port 12 for pulp 1 and an inlet port 13 of an alkali metal hydroxide solution 2 at one end of the contactor. The pulp and the alkali metal hydroxide solution introduced into the contactor are moved from the one end to the other end in a direction T while brought into contact with each other to generate a contact mixture. Then the contact mixture is discharged from an outlet port 14. The contact mixture thus discharged is drained by a drainer 20, whereby a cake of alkali cellulose 3 is separated. The liquid recovered by the drainer is sent to a tank 30 for an alkali metal hydroxide solution and then sent, by a pump 31, to the bucket conveyor type contactor for recycling.

It may be preferable that the bucket conveyor type contactor can control the temperature of the alkali metal hydroxide solution or the contact time freely. The composition of the alkali cellulose varies depending on the amount of the alkali metal hydroxide solution absorbed by the pulp and this absorption amount can be adjusted by controlling the contact time and the temperature of the alkali solution. Accordingly, the apparatus capable of controlling it can produce alkali cellulose having a desired composition.

Although the temperature of the alkali metal hydroxide solution can be controlled by a known technique, a heat exchanger may be preferably used. The heat exchanger may be installed inside or outside the bucket conveyor. Although no particular limitation is imposed on the temperature of the alkali metal hydroxide solution, it may be adjusted to be 20 to 80° C.

In the present invention, the contact time may be controlled preferably by changing the moving speed or moving distance of the bucket. The term "moving distance" as used herein means a moving distance of the pulp and the alkali metal hydroxide solution while they are brought into contact with each other.

The moving speed of the bucket conveyor may be preferably 0.0005 to 10 m/s, especially preferably 0.005 to 5 m/s. When the moving speed is less than 0.0005 m/s, the equipment may become impractically large. When it is more than 10 m/s, an excessive burden may be imposed on the driving portion of the conveyor. The moving distance of the bucket conveyor may be preferably 0.5 to 100 m, especially preferably 1 to 50 m. When it is less than 0.5 m, control of the absorption amount may become difficult. When it is more than 100 m, the equipment may become impractically large.

The contact time between the pulp and the alkali metal hydroxide solution may be preferably from 1 second to 15 minutes, especially preferably from 2 seconds to 2 minutes. When the contact time is less than 1 second, it may be highly difficult to control the absorption amount. When the contact time is more than 15 minutes, the apparatus may be excessively large so that productivity may be deteriorated. In addition, the pulp may absorb too much amount of the alkali so that it may become difficult for any drainer to prepare alkali cellulose having a desired composition suited for the preparation of cellulose ether.

It may be preferable that the bucket conveyor type contactor can have continuous treatment. Such a continuous apparatus may be advantageous over a batch one because the continuous apparatus itself can be made smaller than the batch one so that it may be advantageous in view of space economy.

It has to be avoided in order to obtain a good quality product that the pulp which has been introduced into the contactor passes without contact with the alkali. Since the pulp is apt to float in the alkali metal hydroxide solution, the pulp has to pass through the bucket conveyor type contactor while ensuring complete contact with the alkali metal hydroxide solution. It may be preferable that the pulp and the alkali metal hydroxide solution are introduced successively in the bucket, or the pulp and the alkali metal hydroxide solution are mixed prior to introduction into the bucket. In the latter case, the pulp and the alkali metal hydroxide solution have already been brought into contact with each other so that it may be preferable to control the contact time before the introduction into the bucket. The bucket may be stirred by a proper method during conveyance.

It may be preferably that the bucket conveyor type reactor can be evacuated or nitrogen-purged in order to prevent a reduction in the polymerization degree of the alkali cellulose in the presence of oxygen. If the control of the polymerization degree in the presence of oxygen is desired at the same time, the contactor having a structure capable of controlling an oxygen amount may be preferred.

No particular limitation is imposed on the alkali metal hydroxide solution to be used in the invention insofar as alkali cellulose can be obtained using it. An aqueous solution of sodium hydroxide solution or potassium hydroxide may be preferred, with the former one being especially preferred from an economical viewpoint. The concentration of the solution may be preferably 23 to 60% by weight, especially preferably 35 to 55% by weight. When the concentration is less than 23% by weight, it may be economically disadvantageous because a side reaction between an etherifying agent and water may occur during the subsequent preparation of cellulose ether. Moreover, cellulose ether having a desired degree of substitution may not b obtained and an aqueous solution of the cellulose ether thus prepared may not be inferior in transparency. When the concentration is more than 60% by weight, the solution may not be handled easily because of an increase in viscosity. The concentration of the alkali metal hydroxide solution to be provided for the contact with the pulp may be preferably kept constant in order to stabilize the composition of the alkali cellulose and ensure the transparency of the cellulose ether.

According to the invention, the uniformity of the alkali distribution can be improved even if an inert solvent such as lower alcohol preferably having 1 to 4 carbons is not used. However, use of such a solvent does not pose any problem. Use of such a solvent can improve uniformity of alkali distribution and bulk density of alkali cellulose.

According to the present invention, after the pulp and the alkali metal hydroxide solution are brought into contact with each other in the bucket conveyor type contactor, an excess alkali metal hydroxide solution is removed from the contact mixture by a drainer such as a squeezer so as to obtain alkali cellulose.

The drainer may include a drainer making use of a centrifugal force such as a decanter or a rotating basket; a mechanical drainer such as a roll type, a V-shaped disc press or bucket press; and a vacuum filter. From the viewpoint of uniform draining, a drainer making use of a centrifugal force may be preferred. In addition, it may be preferable that a drainer can conduct continuous treatment. Examples may include a screw discharge type centrifugal dehydrator, an extrusion plate type centrifugal separator and a decanter. In a drainer making use of centrifugal force, a required draining degree can be attained by adjusting the rotation speed of the drainer. In a mechanical drainer and a vacuum filter, a required draining degree can be attained by adjusting a draining pressure and a degree of vacuum, respectively.

The alkali solution recovered by draining can be recycled. When it is recycled, an alkali metal hydroxide solution may be preferably supplied to the system continuously in an amount equal to that of the alkali metal hydroxide solution taken out of the system as alkali cellulose. In this case, it may be possible to transfer the alkali solution recovered by draining to the tank once, and then feed it from the tank to an apparatus for contact, and then add a new alkali metal hydroxide solution so as to keep a constant level in the tank.

When the alkali solution recovered by draining is recycled, it may be especially preferable that both of a continuous centrifugal separator having a perforated rotor and a continuous centrifugal separator having an imperforate rotor are used together. This makes it possible to prevent the clogging of the centrifugal separator having a perforated rotor and prevent filtration failure or oscillation of the centrifugal separator caused thereby. First of all, a mixture obtained by the contact of the pulp with the alkali metal hydroxide solution is separated into a liquid and a solid by using a continuous centrifugal separator equipped with a perforated rotor. Then, the fine solid in the separated liquid is further separated by a continuous centrifugal separator having an imperforate rotor. A part or all of the liquid separated by the continuous centrifugal separator having a perforated rotor can be directly introduced into the continuous centrifugal separator having an imperforate rotor. Alternatively, it can be placed in the tank and then introduced into the continuous centrifugal separator having an imperforate rotor. The solid recovered from the separated liquid by the continuous centrifugal separator having an imperforate rotor can be used as alkali cellulose.

The continuous centrifugal separator can control the number of rotation, depending on the contact time and the contact temperature between pulp and an alkali metal hydroxide solution, and necessary draining degree. In other words, the continuous centrifugal separator can control a centrifugal effect. The control of the centrifugal effect can keep the concentration of the alkali metal hydroxide solution constant, the solution being fed repeatedly for the contact with the pulp. Consequently, the cellulose ether having high transparency can be obtained. When the contact time and/or the contact temperature is increased from the present operation, the centrifugal effect can be reduced. When the contact time and/or contact temperature is lowered, the centrifugal effect can be increased. It may be preferable to keep the variation of the concentrations of the alkali metal hydroxide solution within ±10%, especially preferably ±5%.

Incidentally, the centrifugal effect is a value indicating a magnitude of the centrifugal force and is given by a ratio of the centrifugal force to the gravity (see "New Edition Chemical Engineering Dictionary Edited by Society for Chemical Engineers, Japan", published on May 30, 1974). The centrifugal effect Z is represented by the following equation.

$$Z=(\omega^2 r)/g=V^2/(gr)=\pi^2 N^2 r/(900g)$$

wherein "r" represents a rotational diameter (unit: m) of a rotator, "ω" represents an angular rate (unit: rad/sec) of a rotator, "V" represents a circumferential rate (unit: m/sec) of a rotator, "N" represents a rotational number (unit: rpm) of a rotator and "g" represents a gravitational acceleration (unit: m/sec$^2$).

A weight ratio of the alkali metal hydroxide contained by the cake obtained by draining to the solid content by the pulp (alkali metal hydroxide/solid portion in the pulp) may be preferably 0.3 to 1.5, more preferably 0.65 to 1.30, still more preferably 0.90 to 1.30. When the weight ratio falls within a range of 0.3 to 1.5, the cellulose ether thus obtained has improved transparency. The solid portion in the pulp may include, in addition to cellulose which is a main component, hemicellulose, lignin, organic matters such as a resin, and inorganic matters such as Se and Fe components.

The weight ratio of (alkali metal hydroxide)/(solid portion in the pulp) can be determined by the following titration method.

First, 4.00 g of a cake is sampled and the weight percentage (wt %) of the alkali metal hydroxide contained by the cake is determined by neutralization titration (0.5 mol/L $H_2SO_4$, indicator: phenolphthalein). A blank test is also performed in a similar manner.

Wt % of alkali metal hydroxide=(normality factor)×{(dropped amount (ml) of $H_2SO_4$)−(dropped amount (ml) of $H_2SO_4$ in blank test)}

Using the wt % of the alkali metal hydroxide contained by the cake, a weight ratio of the alkali metal hydroxide to the solid portion contained in the pulp is then determined in accordance with the following equation:

(weight of alkali metal hydroxide)/(weight of solid portion in pulp)=(wt % of alkali metal hydroxide)÷[{100−(wt % of alkali metal hydroxide)/(B/100)}×(S/100)].

In the above equation, "B" represents the concentration (wt %) of the alkali metal hydroxide solution and "S" represents the concentration (wt %) of the solid portion in the pulp. The concentration of the solid portion in the pulp is obtained by dividing the residual weight after drying about 2 g of sampled pulp at 105° C. for 2 hours, by the weight of the sampled pulp and is expressed by weight percentage.

A feed rate of the pulp to the bucket conveyor type contactor; and a recovery rate of the alkali cellulose after draining, or a consumption rate of the alkali metal hydroxide solution are measured. The composition of the alkali cellulose at present is calculated based on their weight ratios. The contact time, a temperature of the alkali metal hydroxide solution in the bucket conveyor, or draining degree such as a squeezing pressure can be controlled so as to conform the calculated composition to a target composition. The above-described measurements, calculation and controlling operations can be automated.

The composition of the alkali cellulose can be determined by the etherification degree of cellulose ether obtained from the alkali cellulose, that is, the molar substitution degree or value.

Using the alkali cellulose obtained by the above-described preparation method as a raw material, cellulose ether can be prepared in a known manner.

The reaction method may include a batch type or a continuous type. The continuous type is employed for the preparation of the alkali cellulose according to the present invention so that continuous type for the preparation of cellulose ether is preferred, but batch reaction is feasible.

In the batch type, the alkali cellulose discharged from the drainer may be stored in a buffer tank or charged directly in an etherification reactor. It may be preferable to store the alkali cellulose in the buffer tank and then charge the alkali cellulose in a reaction vessel in a short period of time in order to reduce its occupancy time in the etherification reactor. This leads to an increase in productivity. The buffer tank is preferably evacuated or purged with nitrogen so as to form an oxygen-free atmosphere therein, whereby a reduction in the polymerization degree can be suppressed.

Examples of cellulose ether obtainable from the resulting alkali cellulose as a starting material may include alkyl cellulose, hydroxyalkyl cellulose, hydroxyalkylalkyl cellulose and carboxymethyl cellulose.

Examples of the alkyl cellulose may include methyl cellulose having a methoxyl group of 1.0 to 2.2 (D.S.) and ethyl cellulose having ethoxyl group of 2.0 to 2.6 (D.S.). It should be noted that D.S. (degree of substitution) means the average number of substituted hydroxyl groups in the anhydrous glucose unit, while M.S. (molar substitution) means the average number of substituents in the anhydrous glucose unit.

Examples of the hydroxyalkyl cellulose may include hydroxyethyl cellulose having a hydroxyethoxyl group of 0.05 to 3.0 (M.S.) and hydroxypropyl cellulose having a hydroxypropoxyl group of 0.05 to 3.3 (M.S.).

Examples of the hydroxyalkylalkyl cellulose may include hydroxyethylmethyl cellulose having a methoxyl group of 1.0 to 2.2 (D.S.) and a hydroxyethoxyl group of 0.1 to 0.6 (M.S.), hydroxypropylmethyl cellulose having a methoxyl group of 1.0 to 2.2 (D.S.) and a hydroxypropoxyl group of 0.1 to 0.6 (M.S.), and hydroxyethylethyl cellulose having an ethoxyl group of 1.0 to 2.2 (D.S.) and a hydroxyethoxyl group of 0.1 to 0.6 (M.S.).

Carboxymethyl cellulose having a carboxymethoxyl group of 0.2 to 2.2 (D.S.) can also be given as an example of cellulose ether.

Examples of the etherifying agent may include alkyl halide such as methyl chloride and ethyl chloride; alkylene oxide such as ethylene oxide and propylene oxide; and monochloroacetic acid.

EXAMPLES

The present invention will hereinafter be described by Examples. It should not be construed that the present invention is not limited to or by these Examples.

Example 1

A slurry prepared in advance by mixing 10-mm square pulp chips produced by wood and having a solid concentration of 93 wt % and a 49 wt % aqueous sodium hydroxide solution of 40° C. for 5 seconds was continuously introduced into an operating inductive discharge type bucket conveyor type contactor having a bucket capacity of 2 L, a moving distance of 5 m, a bucket moving rate of 0.17 m/s. In one bucket, the 0.03 kg of pulp and 1 L of a 49 wt % aqueous sodium hydroxide solution of 40° C. were introduced per bucket. At the outlet of the bucket conveyor was disposed a V-shaped disc press as a drainer, by which a mixture of the pulp chips and the sodium hydroxide solution discharged from the bucket conveyor was drained continuously. The weight ratio of the alkali metal hydroxide contained by the obtained alkali cellulose to the solid portion contained by the pulp, which was determined by the titration method, was in 1.25.

Example 2

In a similar manner to Example 1 except that the bucket moving rate was set at 0.23 m/s and a screw discharge type centrifugal dehydrator having a centrifugal effect of 600 was installed as a drainer at the outlet of the bucket conveyor, alkali cellulose was obtained. The weight ratio of the alkali metal hydroxide contained by the obtained alkali cellulose to the solid portion contained by the pulp, which was determined by the titration method, was 1.00.

Example 3

In a similar manner to Example 1 except that the bucket moving distance was set at 3.7 m and an extrusion plate type centrifugal dehydrator comprising a 0.2-mm slit screen and having a centrifugal effect of 600 was installed as a drainer at the outlet of the bucket conveyor, alkali cellulose was obtained. The weight ratio of the alkali metal hydroxide contained by the obtained alkali cellulose to the solid portion contained by the pulp, which was determined by the titration method, was 1.00.

Example 4

The alkali cellulose (20 kg) obtained in Example 1 was placed in a pressure-resistant reactor. After vacuuming, 11 kg of methyl chloride and 2.7 kg of propylene oxide were added for a reaction. The reaction product was washed, dried and pulverized to yield hydroxypropylmethyl cellulose. The hydroxypropylmethyl cellulose thus obtained had a methoxyl group (DS) of 1.90 and a hydroxypropoxyl group (MS) of 0.24. The viscosity at 20° C. of a 2 wt % aqueous solution of the hydroxypropylmethyl cellulose was 10,000 mPa·s. The light transmittance at 20° C. of the 2 wt % aqueous solution thereof was measured using a photoelectric calorimeter "PC-50", a cell length of 20 mm and visible light, and was 98.0%.

Example 5

A slurry prepared in advance by mixing for 5 seconds 10-mm square pulp chips produced by wood and having a solid concentration of 93 wt % with a 44 wt % aqueous sodium hydroxide solution of 40° C. delivered from a tank was continuously introduced into an operating inductive discharge type bucket conveyor type contactor having a bucket capacity of 2 L, a moving distance of 5 m and a bucket moving rate of 0.23 m/s. The 0.03 kg of pulp and 1 L of a 44 wt % aqueous sodium hydroxide solution of 40° C. were introduced per bucket. At the outlet of the bucket conveyor type contactor was installed a screw discharge type centrifugal dehydrator as a drainer, by which a mixture of the pulp chips and the sodium hydroxide solution discharged from the bucket conveyor type contactor was drained continuously at a centrifugal effect of 600. The liquid thus separated was received by the tank and recycled for the contact with the pulp. A 49 wt % aqueous sodium hydroxide solution was continuously fed to the tank in order to keep the solution level of the tank constant. The concentration of the solution in the tank was left at 44 wt %. The weight ratio of the alkali metal hydroxide contained by the obtained alkali cellulose to the solid portion contained by the pulp, which was determined by the titration method, was 1.00.

In a pressure-resistant reactor was placed 5.5 kg in terms of cellulose content of the alkali cellulose thus obtained. After vacuuming, 9 kg of methyl chloride and 1.4 kg of propylene oxide were added for a reaction. The reaction product was washed, dried and pulverized to yield hydroxypropylmethyl cellulose. The substitution degree of the resulting cellulose ether, a viscosity at 20° C. of a 2 wt % aqueous solution thereof and light transmittance at 20° C. of a 2 wt % aqueous solution thereof are shown in Table 1. The light transmittance at 20° C. of the 2 wt % aqueous solution thereof was measured using a photoelectric calorimeter "PC-50", a cell length of 20 mm and visible light.

Example 6

A slurry prepared in advance by mixing for 5 seconds 10-mm square pulp chips produced by wood and having a solid concentration of 93 wt % with a 44 wt % aqueous sodium hydroxide solution of 40° C. delivered from a tank was continuously introduced into an operating inductive discharge type bucket conveyor type contactor having a bucket capacity of 2 L, a moving distance of 5 m and a bucket moving rate of 0.23 m/s. The 0.03 kg of pulp and 1 L of a 44 wt % aqueous sodium hydroxide solution of 40° C. were introduced per bucket. At the outlet of the bucket conveyor type contactor was installed a screw discharge type centrifugal dehydrator as a drainer, whereby a mixture of the pulp chips and the sodium hydroxide solution discharged from the bucket conveyor type contactor was drained continuously at a centrifugal effect of 600. The liquid thus separated was received by the tank, and then sent by a pump to a decanter which was under operation at a centrifugal effect of 2500, where a fine solid was collected. The fine solid thus collected was added into the alkali cellulose. The liquid which had passed through the decanter returned to the tank and was recycled for the contact with the pulp. A 49 wt % aqueous sodium hydroxide solution was continuously fed to the tank in order to keep the solution level of the tank constant. The concentration of the solution in the tank was maintained at 44 wt %. The weight ratio of the alkali metal hydroxide contained by the obtained alkali cellulose to the solid portion contained by the pulp, which was determined by the titration method, was 1.00.

In a pressure-resistant reactor was placed 5.5 kg in terms of cellulose content of the alkali cellulose thus obtained. After vacuuming, 9 kg of methyl chloride and 1.4 kg of propylene oxide were added for a reaction. The reaction product was washed, dried and pulverized to yield hydroxypropylmethyl cellulose. The degree of substitution of the resulting cellulose ether, viscosity at 20° C. of a 2 wt % aqueous solution of the cellulose ether and light transmittance at 20° C. of a 2 wt % aqueous solution thereof are shown in Table 1. The light transmittance at 20° C. of the 2 wt % aqueous solution thereof was measured using a photoelectric calorimeter "PC-50", a cell length of 20 mm and visible light.

Example 7

In a similar manner to Example 6 except that the temperature of the 44 wt % aqueous sodium hydroxide solution was decreased to 20° C. and the centrifugal effect of the screw discharge type centrifugal dehydrator was raised to 1000, alkali cellulose was obtained. The concentration of the aqueous sodium hydroxide solution in the tank was kept at 44 wt %. The weight ratio of the alkali metal hydroxide contained by the obtained alkali cellulose to the solid portion contained by the pulp, which was determined by the titration method, was 0.60.

In a similar manner to Example 6 except that 6.5 kg of methyl chloride and 1.2 kg of propylene oxide were added, cellulose ether was prepared. The viscosity at 20° C. of a 2 wt % aqueous solution of the resulting cellulose ether and light transmittance at 20° C. of a 2 wt % aqueous solution thereof are shown in Table 1.

Example 8

In a similar manner to Example 6 except that the moving rate of the bucket was changed to 0.17 m/s and the centrifugal effect of the screw discharge type centrifugal dehydrator was decreased to 300, alkali cellulose was obtained. The concentration of the aqueous sodium hydroxide solution in the tank was kept at 44 wt %. The weight ratio of the alkali metal hydroxide contained by the obtained alkali cellulose to the solid portion contained by the pulp, which was determined by the titration method, was 1.25.

In a similar manner to Example 6 except that 11 kg of methyl chloride and 2.7 kg of propylene oxide were added, cellulose ether was prepared. The viscosity at 20° C. of a 2 wt % aqueous solution of the resulting cellulose ether and light transmittance at 20° C. of a 2 wt % aqueous solution thereof are shown in Table 1.

Example 9

In a similar manner to Example 6 except that the moving rate of the bucket was changed to 0.17 m/s, alkali cellulose was obtained. The centrifugal effect of the screw discharge type centrifugal dehydrator was left at 600. The concentration of the aqueous sodium hydroxide solution in the tank became 46 wt %. The weight ratio of the alkali metal hydroxide contained by the obtained alkali cellulose to the solid portion contained by the pulp, which was determined by the titration method, was 1.25.

In a similar manner to Example 6 except that 11 kg of methyl chloride and 2.7 kg of propylene oxide were added, cellulose ether was prepared. The viscosity at 20° C. of a 2 wt % aqueous solution of the resulting cellulose ether and light transmittance at 20° C. of a 2 wt % aqueous solution thereof are shown in Table 1.

TABLE 1

| | Substitution degree of cellulose ether | | Aqueous 2 wt % solution of cellulose ether | |
|---|---|---|---|---|
| | Methoxyl group (DS) | Hydroxypropoxyl group (MS) | Viscosity (mPa · s) | Transmittance at 20° C. (%) |
| Example 5 | 1.80 | 0.15 | 10000 | 96.5 |
| Example 6 | 1.80 | 0.15 | 10040 | 96.5 |
| Example 7 | 1.40 | 0.20 | 10040 | 93.0 |
| Example 8 | 1.90 | 0.25 | 10030 | 98.5 |
| Example 9 | 1.90 | 0.25 | 9990 | 97.0 |

The invention claimed is:

1. A method for preparing cellulose ether, comprising the steps of:

bringing pulp into continuous contact with an alkali metal hydroxide solution in a bucket conveyor type contactor to generate a contact mixture;

draining the contact mixture; and etherifying the alkali cellulose prepared in the draining step with an etherifying agent to produce cellulose ether, and wherein a weight ratio of the alkali metal hydroxide contained by a cake obtained in the draining step to a solid portion contained by the pulp is 0.3 to 1.5.

2. The method for preparing cellulose ether according to claim 1, wherein a weight ratio of the alkali metal hydroxide contained by a cake obtained in the draining step to a solid portion contained by the pulp is controlled by changing a moving rate or a moving distance of a bucket conveyor of the bucket conveyor type contactor.

3. The method for preparing a cellulose ether according to claim 1, wherein the pulp is in the form of chips.

4. The method for preparing a cellulose ether according to claim 1, wherein the bucket conveyor type contactor comprises a bucket conveyor having a moving speed from 0.005 to 5 m/s.

5. The method for preparing a cellulose ether according to claim 1, wherein the bucket conveyor type contactor comprises a bucket conveyor having a moving distance from 0.5 to 100 m.

6. The method for preparing a cellulose ether according to claim 1, wherein the pulp and the alkali metal hydroxide solution are introduced successively in the bucket conveyor type contactor.

* * * * *